US007821765B2

(12) United States Patent
Kinsey

(10) Patent No.: US 7,821,765 B2
(45) Date of Patent: Oct. 26, 2010

(54) ION GENERATING LIGHT ASSEMBLY

(76) Inventor: William Kinsey, 24307 Magic Mountain Pkwy. #120, Valencia, CA (US) 91355

( * ) Notice: Subject to any disclaimer, the term of this patent is extended or adjusted under 35 U.S.C. 154(b) by 69 days.

(21) Appl. No.: 12/009,139

(22) Filed: Jan. 16, 2008

(65) Prior Publication Data

US 2009/0179140 A1 Jul. 16, 2009

(51) Int. Cl.
*H02H 1/00* (2006.01)

(52) U.S. Cl. ...................................... 361/231; 361/212

(58) Field of Classification Search ................. 361/212, 361/213, 229, 231

See application file for complete search history.

(56) References Cited

U.S. PATENT DOCUMENTS

2005/0163669 A1* 7/2005 Taylor et al. ................ 422/121
2006/0078460 A1* 4/2006 Ryu et al. ...................... 422/5
2007/0047218 A1* 3/2007 Hsieh .......................... 362/92
2008/0006009 A1* 1/2008 Kiern et al. ................ 55/385.1

* cited by examiner

*Primary Examiner*—Danny Nguyen
(74) *Attorney, Agent, or Firm*—Charles R. Sutton; Law Offices of Roger C. Hsu

(57) ABSTRACT

A light to plug into a wall socket having a negative ion generator in the form of a pin. The pin design can be easily cleaned with a swab and cleaning solution such as rubbing alcohol, eliminating the need to trim or clean a brush electrode when corrosion or deposits form. The negative ion generator is always on and produces the negative ions to purify the air. The device can have a light sensor to activate the light when light is low. The device can also come with light emitting diodes which can be set to indicate the status of the various systems of the device. The device can come equipped with an air freshener that disperses vaporized perfume into the air.

4 Claims, 8 Drawing Sheets

ION GENERATING LIGHT ASSEMBLY

CROSS REFERENCE TO RELATED APPLICATIONS

This application is related to the design applications numbered 29/293894 and 29/293890 which were both filed on Dec. 14, 2007 and were both invented by William Kinsey. This application is not a continuation of those applications, nor does it necessarily incorporate those applications by reference. Those applications are simply germane in the sense that they cover ornamental designs for the exterior of the device disclosed in this application.

STATEMENT REGARDING FEDERALLY SPONSORED RESEARCH OR DEVELOPMENT

This invention was not made using federally sponsored research and development. The inventor retains all rights.

BACKGROUND OF THE INVENTION

There are numerous inventions generating negative ions for one purpose or another, many of which claim both a positive and a negative pole or have a brush shaped ion generator. Excessively complex generators can greatly reduce life span of the device because, frankly, difficulties in cleaning generally result in no cleaning. Cleaning techniques involving the trimming of brush filaments will obviously result in reduction of the brush filament surface area available. Eventually the ion generating surface is either so oxidized or corroded that the number of ions emitted is substantially reduced or else the ion generating surface is reduced to nothing by the act of trimming. Either way a new device becomes necessary. Frequently generating negative ions is for the purpose of cleaning the air. Other devices exist which provide fragrances for the air, thus masking disagreeable odors. Sometimes these fragrance distributors are combined with a plug in night light. These devices do not actually clean the air of underlying odor causing agents. They simply add other chemicals into the air. Other devices exist which feature a night light that can be automatically activated in the event there is no illumination. The light is switched on automatically at night.

BRIEF SUMMARY OF THE INVENTION

A light to plug into a wall socket having a negative ion generator in the form of a pin. The pin design can be easily cleaned with a swab and cleaning solution such as rubbing alcohol, eliminating the need to trim or clean a brush electrode when corrosion or deposits form. The pin does not become oxidized as fast as the typical brush style electrode. This represents an improvement over prior art devices which present cleaning difficulties that result in limited useful life span of the device. The negative ion generator is always on while the device is plugged into a wall socket and produces the negative ions to purify the air. The device has a light and can have a light sensor to activate the light when light is low. The device can also come with light emitting diodes which can be set to indicate the status of the various systems of the device. The device can come equipped with an air freshener that disperses vaporized perfume into the air.

DETAILED DESCRIPTION OF THE INVENTION

A light to plug into a wall socket having a negative ion generator in the form of a pin. The pin design can be easily cleaned with a swab and cleaning solution such as rubbing alcohol, eliminating the need to trim or clean a brush electrode when corrosion or deposits form. This represents an improvement over prior art devices which present cleaning difficulties that result in limited useful life span of the device. The negative ion generator is always on when the device is plugged into a wall socket and produces the negative ions to purify the air. The device can also come with light emitting diodes which can be set to indicate the status of the various systems of the device. The device can come equipped with an air freshener that disperses vaporized perfume into the air. It has an energy saving light mounted in a socket, a control circuit connected to the socket, a means to activate or deactivate the light, a negative ion generator in the form of an easily cleanable pin, and a voltage amplification circuit that outputs to the negative ion generating pin. The ions that are generated are negative. They result in a breaking down of the ions in the air either to positive or negative. The negative ions that are generated by the device are convected and cause a binding of the heavier positive ions (which are undesirable) so that they fall to the floor or are deposited on the pin. These positive ions are undesirable because they are unhealthful and/or cause odor. A housing means contains the invention, which in the preferred embodiment is a plastic case shaped in an esthetically pleasing form from which the plug members extend that can be inserted into a standard wall socket. The light also extends outside the housing so it can illuminate the room on demand. If there are LEDs they extend from the surface of the housing, as does the light sensor. There is an aperture from which the negative ions issue forth. The pin is disposed inside the housing and either the housing can be opened or, in the preferred embodiment, the aperture is large enough to admit a swab so the pin can be easily cleaned with a swab using a solution perhaps containing alcohol.

Figure 6:
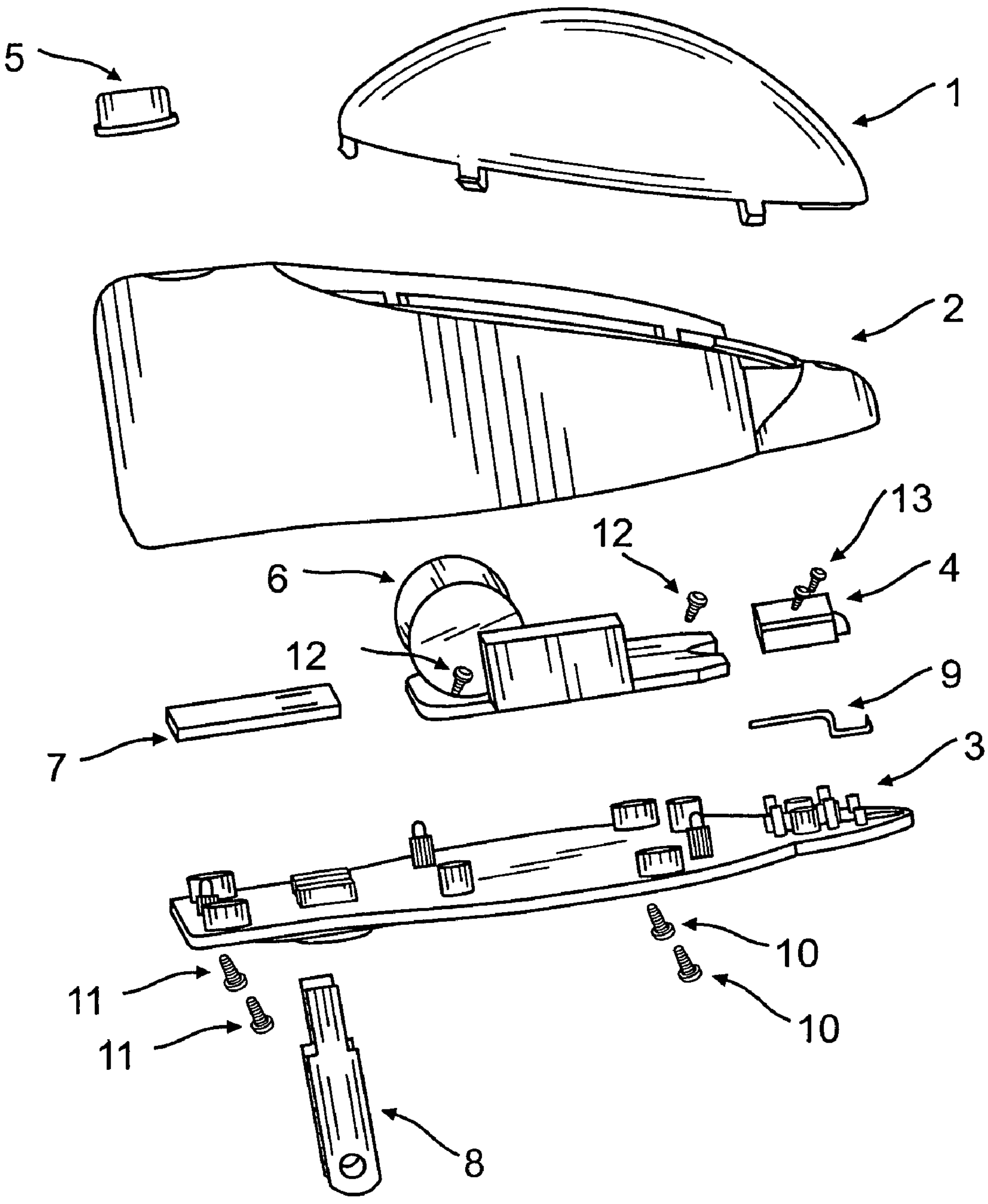
FIG. 6 is an exploded view of the invention
Figure 7:
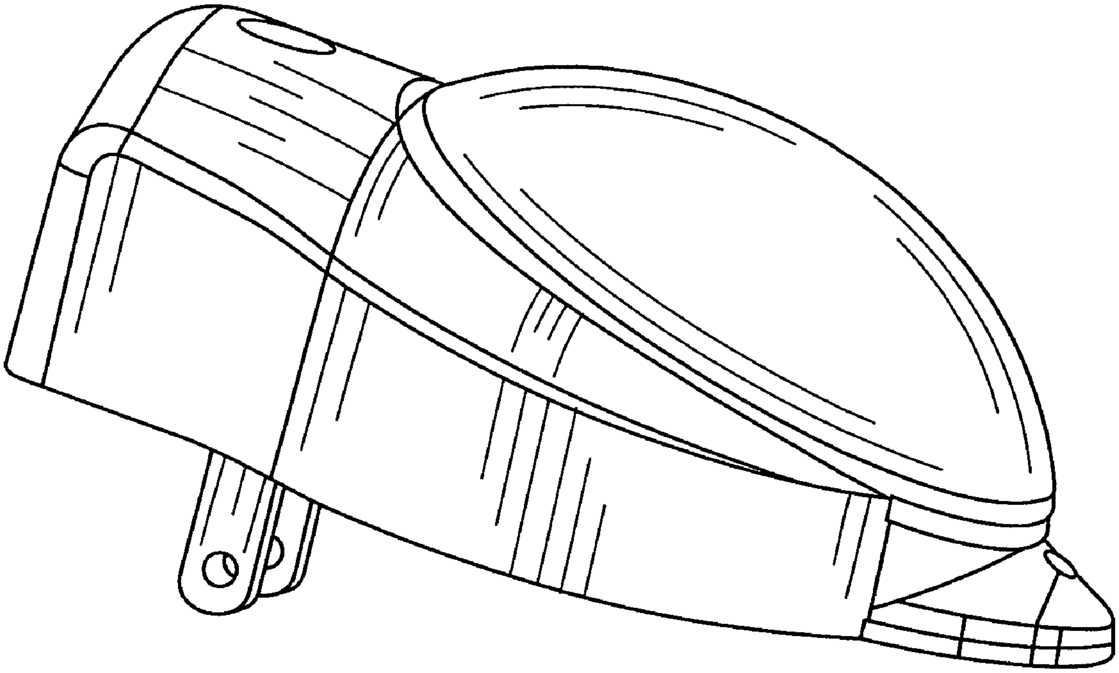
FIG. 7 is a perspective view of the invention in an assembled state

Turning now to FIG. 6, an exploded diagram of the invention, there is a lens cover (1), a top cove (2), a bottom cover (3), a stent cover (4), a photodetector cover (5), a 42×40×1.6 mm PCB-Assembly (6), a 24×21×1.6 mm PCB-Assembly (7), plugs (8), a discharge needle (9), and screws (10)(11)(12)(13).

Figure 1:
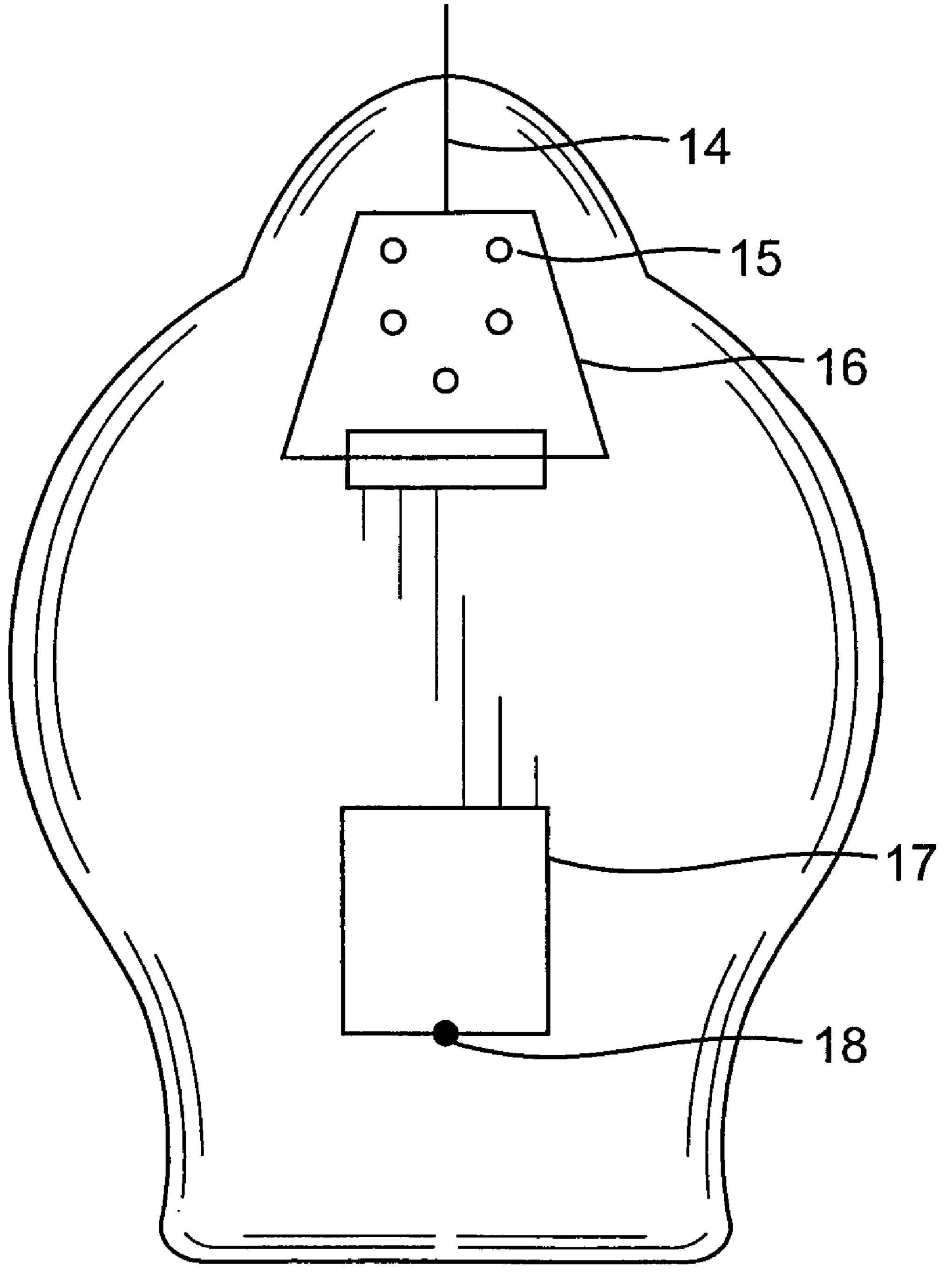
FIG. 1 shows the invention with its pin electrode, LEDs, light sensor and circuit.
Figure 2:
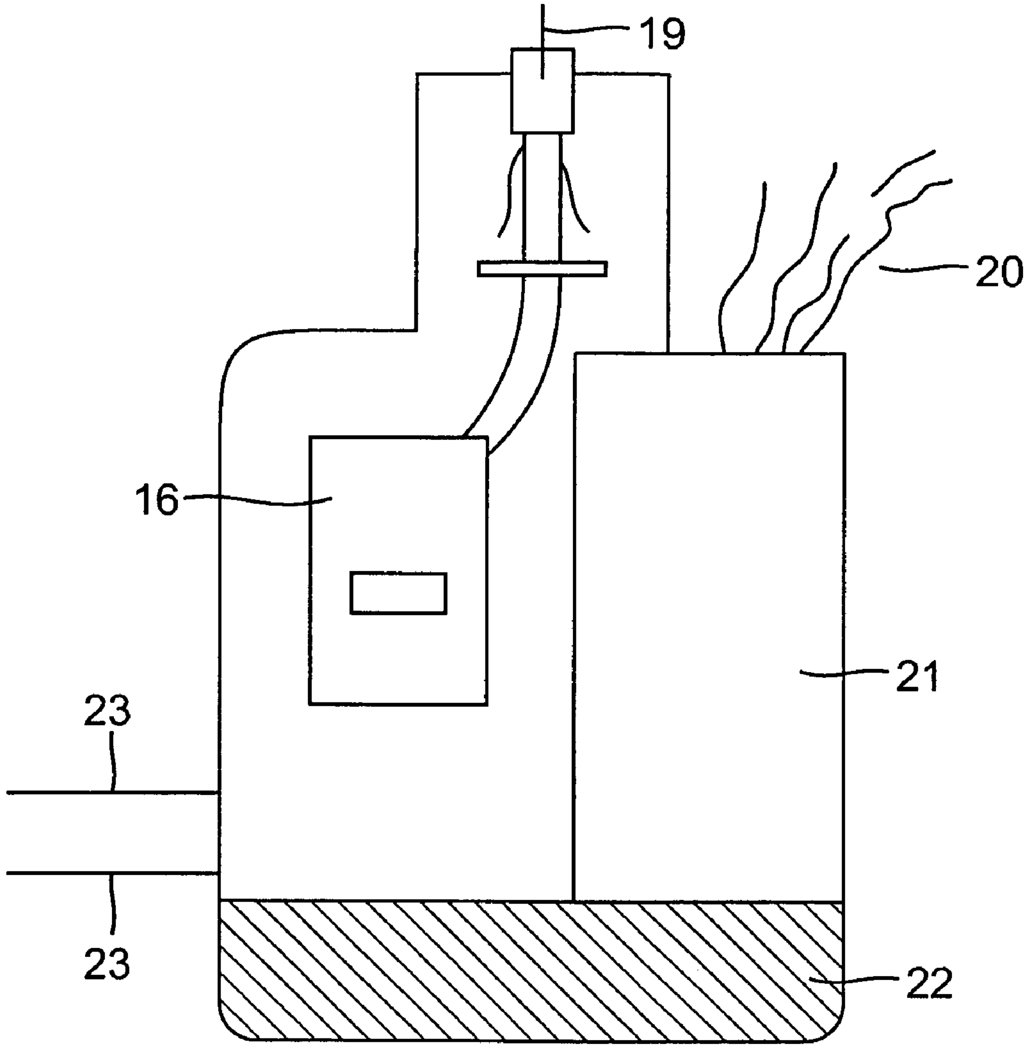
FIG. 2 shows the invention further equipped with a fragrance generator.
Figure 3:
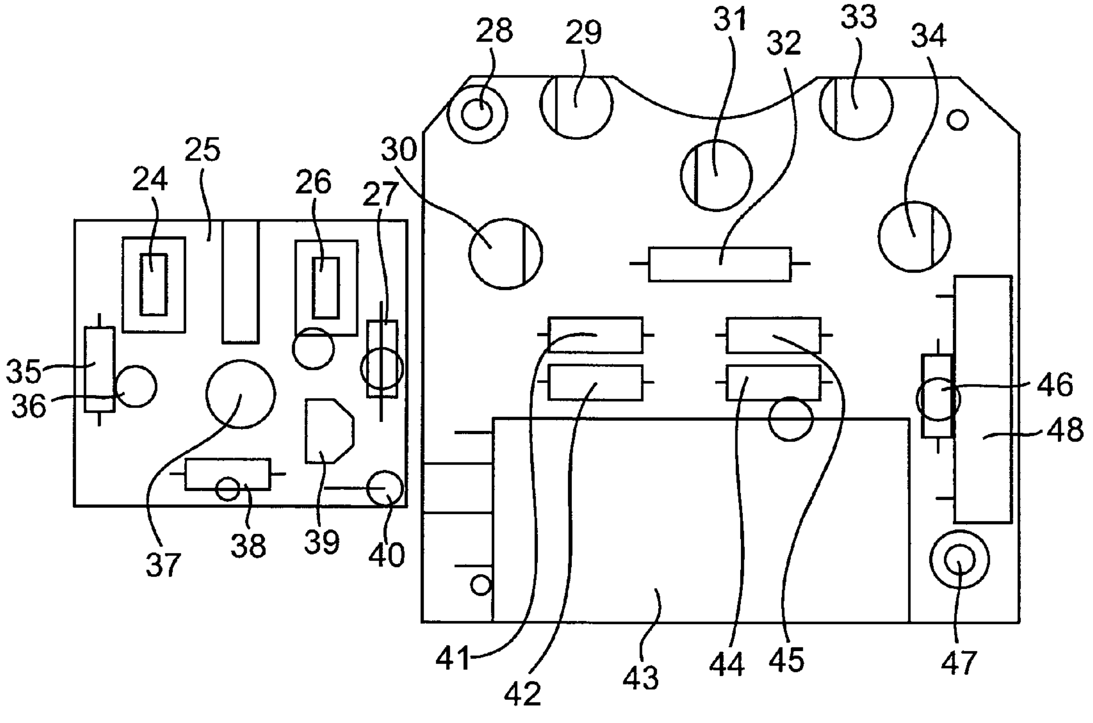
FIG. 3 shows an embodiment of a printed circuit board routing drawing of the ion generator.
Figure 4:
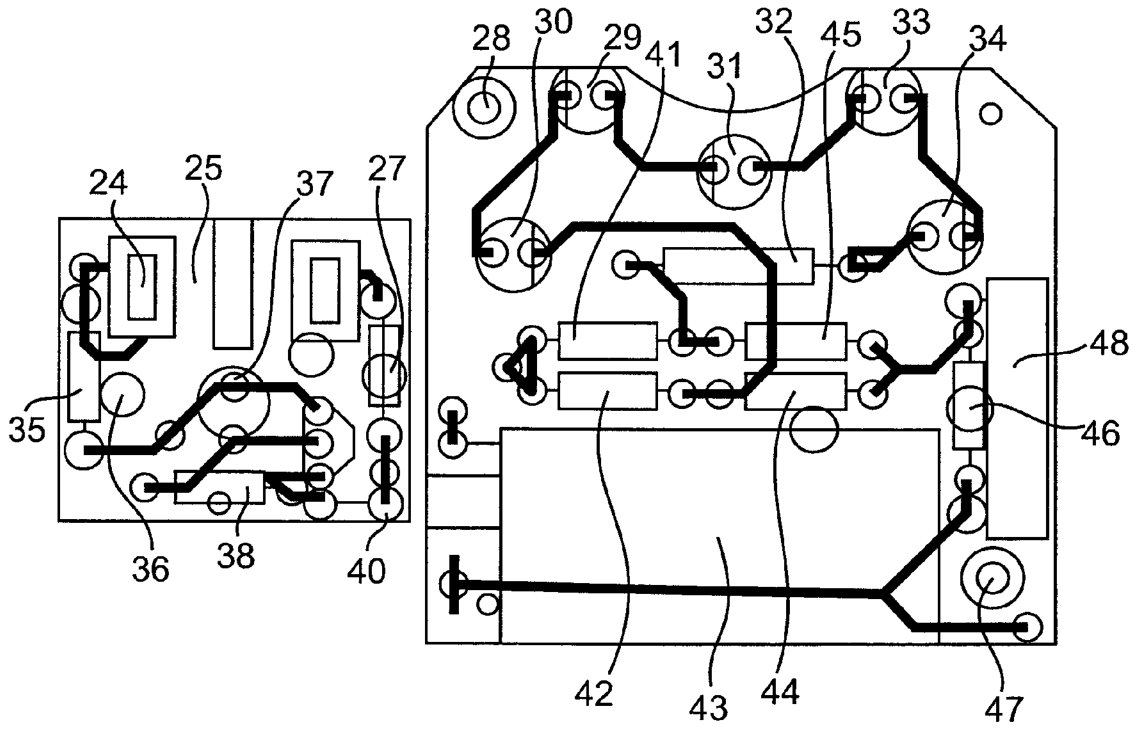
FIG. 4 shows another embodiment of a printed circuit board routing drawing of the ion generator.

Turning now to FIG. 1, there is a pin (14), LED's (15), circuit boards (16)(17), and a light sensor (18). Turning now to FIG. 2 there is a pin ion (19), scent (20), a bottle of scented oil (21), a warmer to vaporize oil (22), and electrical terminals (23). Turning now to FIGS. 3 and 4, there is an HY-2D (24), and E204297 94-VO (25), a z (26), a 250 MA/250 V (27), an INL-2 (28), a DE4 (29), a DE5 (30), a DE3 (31), an R6 (32), a DE2 (33), a DE1 (34), an R3 (35), an M2 (36), an R4 (37), an R2 (38), a Q1 (39), an R1 (40), a D4 (41), a D3 (42), a Model: INL E204297 94-VO HY-1 REV-0 2007.08.21 anion generator (43), a D1 (44), a D2 (45), an R5 (46), an M3 (47), and a C1 X2 224/275 V (48).

Figure 5:
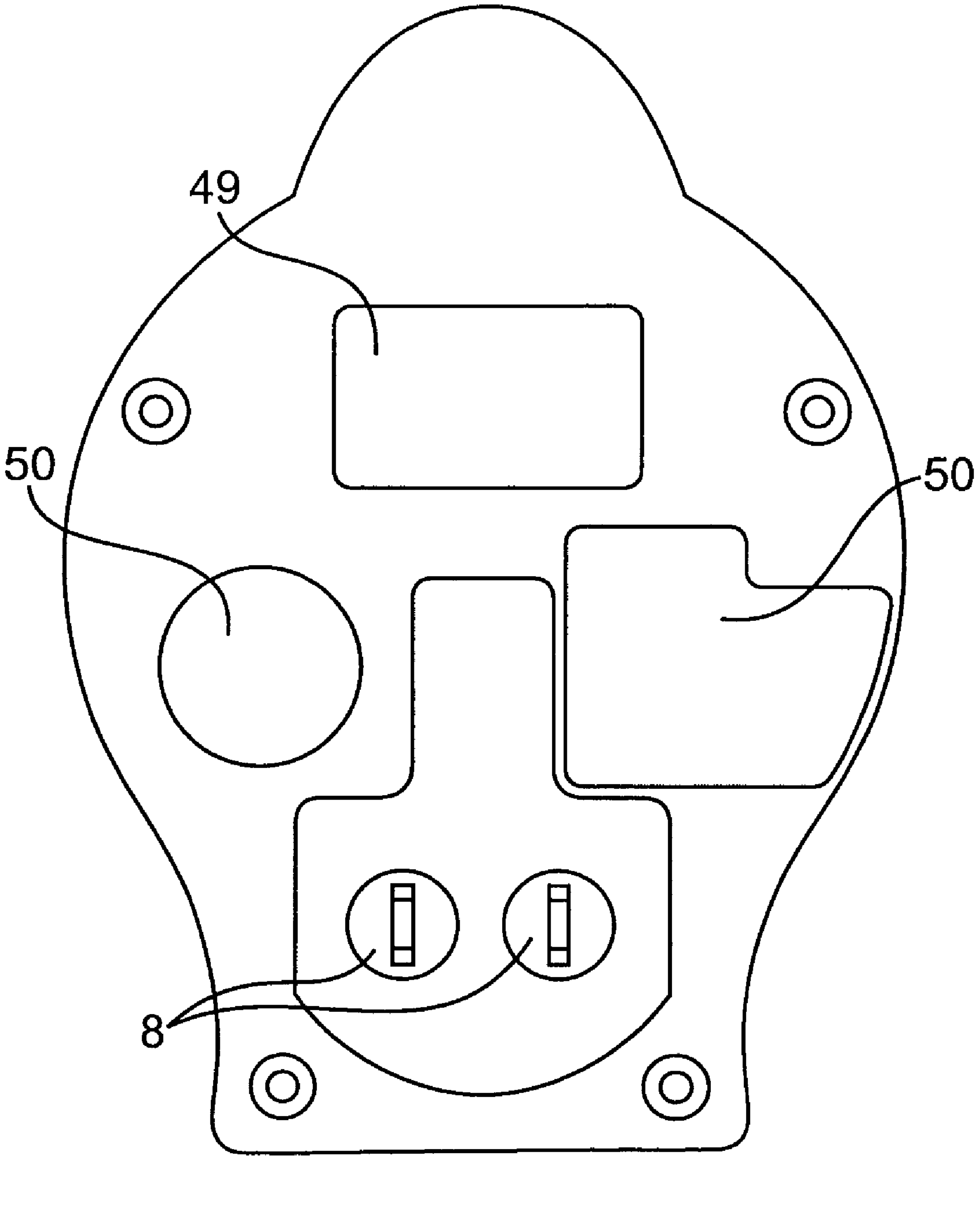
FIG. 5 shows the rear of the intention including wall plug
Figure 8:
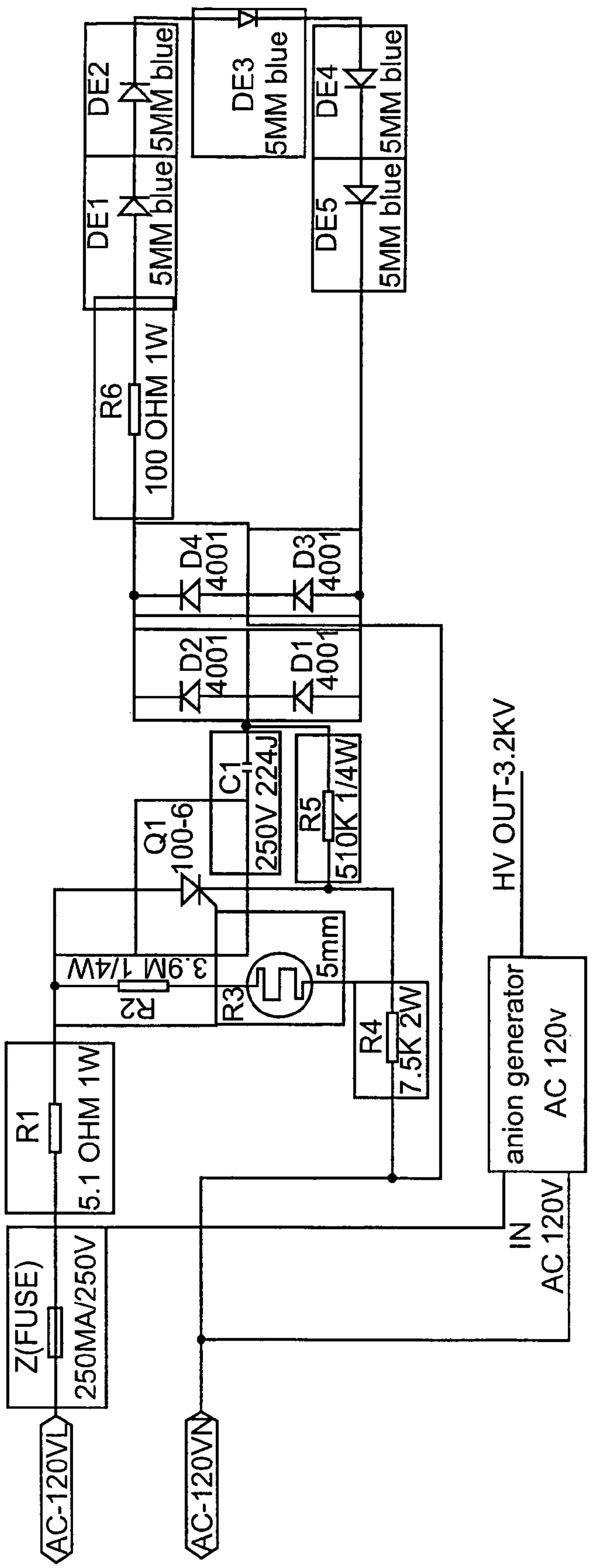
FIG. 8 is a circuit diagram of a preferred embodiment of the invention

Turning now to FIG. 5, there is a Model lable (49), embossed words (50), and a plug (8). Turning now to FIG. 8, there is an AC-120 VN (51), an AC-120 VL (52), an anion generator AC120 v (53), an HV out −3.2 KV (54), an R4 7.5K2 W (55), an R3 5 mm (56), a Z (fuse) 250 MA/250 V (57), an R1 5.1 OHM 1 W (58), an R2 3.9 M1/4 W (59), a Q1 100-6 (60), a C1 250 V 224 J (61), an R5 510 K1/4 W (62), D1 4001 (63), a D2 4001 (64), a D3 4001 (65), a D4 4001 (66), a DE5 5 MM blue (67), a DE45 MM blue (68), a DE3 5 MM blue (69), an R6 100 OHM 1 W (70), a DE1 5 MM blue (71), and a DE2 5 MM blue (72).

I claim:

1. An ion generating light assembly comprising:

a plug adapted to fit into a standard home electrical outlet; said plug being operatively connected to a control circuit, a voltage amplification circuit, a light and an ion generator; said ion generator having a pin to produce ions; said control circuit being adapted to activate said light upon receiving input from a control input and the control input is a switch; and housing means; said housing means containing said control circuit, and said voltage amplification circuit; said plug, said ion generator, and said control input communicating with the exterior of said housing means and means to vaporize chemicals having a pleasant scent and distribute said chemicals outside said housing means.

2. The ion generating light assembly of claim 1 in which said control input is a light sensor.

3. The ion generating light assembly of claim 1 having housing means; said housing means containing said control circuit, and said voltage amplification circuit; said plug, said ion generator, and said control input communicating with the exterior of said housing means and a light sensor connected to said control circuit and adapted to activate said light in the event of low ambient light conditions.

4. An ion generating light assembly comprising:

a plug adapted to fit into a standard home electrical outlet; said plug being operatively connected to a control circuit, a voltage amplification circuit, a light and an ion generator; said ion generator having a pin to produce ions; said control circuit being adapted to activate said light upon receiving input from a control input and having a light sensor connected to said control circuit and adapted to activate the light in event of low ambient light conditions; and housing means; said housing means containing said control circuit, and said voltage amplification circuit; said plug, said ion generator, and said control input communicating with the exterior of said housing means and means to vaporize chemicals having a pleasant scent and distribute said chemicals outside said housing means.

* * * * *